United States Patent [19]

Morin

[11] 4,284,455
[45] Aug. 18, 1981

[54] APPARATUS AND METHOD FOR GENERATING A CONTINUOUSLY-FORMED MANDREL AS A SUPPORTIVE BASE

[76] Inventor: Thomas J. Morin, 19 Nonotuck Rd., West Springfield, Mass. 01089

[21] Appl. No.: 85,010

[22] Filed: Oct. 15, 1979

[51] Int. Cl.$^3$ .............................................. B65H 81/00
[52] U.S. Cl. ...................................... 156/190; 156/95; 156/428; 156/429
[58] Field of Search ................... 156/425, 428–432, 156/195, 190, 143–144, 244.15

[56] References Cited

U.S. PATENT DOCUMENTS

| 2,398,876 | 4/1946 | Bailey | 156/195 X |
| 2,416,416 | 2/1947 | Stoltz | 156/195 |
| 3,173,822 | 3/1965 | Rigaut | 156/244.15 X |
| 3,272,678 | 9/1966 | Swan | 156/429 |
| 3,690,993 | 9/1972 | Hawerkamp | 156/429 |

*Primary Examiner*—David A. Simmons
*Attorney, Agent, or Firm*—Ross, Ross & Flavin

[57] ABSTRACT

Method and apparatus for continuously-developing multi-layer tubing from plural ribbons of wrapping material of indefinite length layered in seriatim upon a continuously-formed mandrel serving as a temporary supportive base for the tubing. A driven cylindrical winding mandrel is rotatable about its longitudinal axis and has a plurality of longitudinally-extending serrations on its exterior periphery. A stationary driving helix is operatively associated with the winding mandrel means for feeding a workpiece in ribbon form through the driving helix. Initial pressure means proximate the driving helix allows the continuous curling of the workpiece radially inwardly into adjacent helical convolutions about the winding mandrel. This impresses serrations on the convolutions mating with the winding mandrel serrations in the generation of the helical coil configuration and the definition of a developing formed mandrel as a supportive base. The driving helix is the means for progressing the formed mandrel longitudinally of the winding mandrel. The interengagement of the mating serrations of the winding and formed mandrels imparts a positive rotative force to the developing formed mandrel. Unreeling means downstream of the initial pressure means allows the in seriatim spiral feeding of a plurality of ribbons for forming successive contiguous helical convolutions in the buildup of a tubing on the winding mandrel. Supplemental pressure means presses the contiguous layers radially inwardly relative to the winding mandrel. Heating means fuses the enwrapped layers. Means allows the removing of the formed mandrel from interiorly of the finally-developed fused self-sustaining tubing.

34 Claims, 10 Drawing Figures

APPARATUS AND METHOD FOR GENERATING A CONTINUOUSLY-FORMED MANDREL AS A SUPPORTIVE BASE

The method aspect of the invention relates to a system for continuously and simultaneously: first, preparing a workpiece from a wire or foil by imparting thereto a desired profile or configuration; second, feeding the so-profiled workpiece in a direction of movement along an X axis to and through the lead-in of a stationary driving helix and outwardly thereof toward a cooperant initial pressure means for producing a sufficient radial load to generate mating serrations on the inner surface of the workpiece as it is being deflected around a serrated forming mandrel rotative within and relative to the helix; third, progressing the formed mandrel translationally along a Z axis of bend by the force of the driving helix longitudinally of the forming mandrel through a first zone of a certain diameter and a following second zone of less-than-certain-diameter with the resultant clearance between the formed mandrel and forming mandrel facilitating the progression; fourth, enwrapping a series of ribbons of tapes of plastic or fabric or metal in successive helical convolutions exteriorly of and around the formed mandrel as it is advanced linearly in the buildup of a tubing; fifth, pressing the tapes into intimate contact with the formed mandrel, utilizing tape forming rollers which also serve to bring the mating serrations on the wire into a point of positive drive on the serrated forming mandrel while allowing the remainder of the formed loop to be free to slide on the serrated forming mandrel; sixth, enwrapping a strip of a reinforcing material such as a wire around the builtup layers of plastic or fabric; seventh, fusing the contiguous layers of the developing structure through a heating procedure; eight, removing the reinforcing material from the outer surface of the constructed tubing, all the while supporting the tubing either internally or externally as it is progressed through its several stages of development, and ninth, removing the formed mandrel from interiorly of the now-self-sustaining tubing.

The apparatus aspect of the invention comprehends equipment for continuously-developing multi-layer tubing from plural ribbons of wrapping material of indefinite length layered in seriatim upon a continuously-formed mandrel serving as a temporary supportive base for the tubing. The equipment includes, in a single machine or in a series of sequentially-arranged subassemblies, the following: a driven cylindrical winding mandrel rotatable about its longitudinal axis and having a plurality of longitudinally-extending serrations on its exterior periphery, a stationary driving helix operatively associated with the winding mandrel, means for feeding a workpiece in ribbon form through the driving helix, initial pressure means proximate the driving helix for continuously curling the workpiece received from the driving helix radially inwardly into adjacent helical convolutions about the winding mandrel with a central axis formed at an oblique angle to the longitudinal axis of the winding mandrel for the impressing of serrations on the convolutions mating with the winding mandrel serrations in the generation of the helical coil and the definition of a developing formed mandrel as a supportive base, the driving helix serving as a means for progressing the formed mandrel longitudinally of the winding mandrel, the mating of the serrations of the winding and formed mandrels serving to impart a positive rotative force to the developing formed mandrel, unreeling means downstream of the initial pressure means for the in seriatim spiral feeding of a plurality of ribbons for forming successive contiguous helical convolutions with each convolution axially displaced along the supportive base from the preceding convolution and with each having a central axis formed at an angle oblique to the longitudinal axis of the winding mandrel in the buildup of a tubing on the winding mandrel, supplemental pressure means for pressing the contiguous layers radially inwardly relative to the winding mandrel, heating means for fusing the enwrapped layers, and means for removing the formed mandrel from interiorly of the finally-developed fused self-sustaining tubing.

By utilization of a driven rotative forming or master mandrel, serrated on its periphery, cooperantly with a fixed or stationary driving helix, both a positive rotative force and a transverse translatory force is imparted to the formed or slave mandrel during the progress of its formation as the supporting base. These concurrent rotative and translatory forces allow the movement of the formed mandrel with and along the forming mandrel and the in seriatim enwrapment of the formed mandrel with one or more tape materials, each in either a side-by-side or overlapping disposition, for the buildup of a tubing of desired structure, which tubing may be of a smooth bore or convoluted design, and may be either rigid or flexible in characteristic.

In a development of a helix from the bending of a straight wire or foil about a cylindrical forming or master mandrel, adverse forces may be anticipated. A net effect is in the experiencing of a resistance to the desired sliding of the formed mandrel relative to the forming mandrel around which the formation ensues, a resistance due in large measure to the naturally-developed compressive forces and related coefficient of friction. A gross effect is in the experiencing of a developed frictional resistance which is additive for each successive circular pitch of the formed mandrel as it is being generated. This condition is existant, whether the formed mandrel is made from wire or foil. Ultimately, these resistive forces reach such a point that they preclude any translational sliding of the formed mandrel on the forming mandrel, presenting a problem obviously begging solution, if continuous propagation of the helical coil is to be realized.

If solution to the control of these built up resistive forces is along the avenue of modifying the forming mandrel geometry, a reverse condition presents itself in which the frictional force needed to maintain the drive for the wire or foil form decreases and slippage occurs, so as to make continuous coil propogation difficult to maintain.

Accordingly, I have proposed the use of a serrated or knurled forming mandrel of such configuration that under proper operating conditions the teeth of the serrated or knurled area will be forced into impingement with the wire or foil of the formed mandrel in process of being formed as a means for generating a positive controlled rotation of the formed mandrel, that is for ensuring the corotation of forming and formed mandrels.

And I have proposed concomitant means for ensuring that the wire or foil slides axially along the forming mandrel as the formed mandrel.

One solution could be to employ a slightly tapered serrated forming mandrel so as to allow the formed mandrel to remove itself from the resisting forces immediately following the generation of the initial loops and continuously thereafter.

Another solution could be to counter the resisting forces by a further working of the initial loops of the wire or foil of the formed mandrel on the forming mandrel so as thus to minimize, if not eliminate, the compressive forces generating the frictional resistance. This conceivably would be accomplished either by way of additional rollers or a driving helix with an increased helical angle.

A third solution, exemplified herein, could allow utilization of a serrated or knurled forming mandrel having a slightly larger diameter in that portion thereof adjacent the arch of the helix and giving to each generated loop of the workpiece a certain diameter, with the coiled formation then being passed forwardly or laterally over the forming mandrel and along that portion where its diameter is less than the said certain diameter, to the end that slippage therealong is facilitated.

Additional to these three solutions, a fourth solution could be in exploiting an arrangement for threading the formed wire or foil with its mating serrations, after passing through the initial pressure roller, about the serrated mandrel in a loose pattern, which is to say, with more serrations on the inside surface of a loop of the formed wire or foil than on the forming mandrel external surface. Such a system finds its anology if the mandrel is considered as a planet gear and the loop is considered as a ring gear.

The forming mandrel of the invention is a rotative hollow tube having a longitudinally serrated or knurled outer periphery, the grooving providing a formation resembling in cross section the toothed edge of a saw, teeth serving to allow impingement with the inner or confronting surface of the circumscribing workpiece (the wire or foil form). This impingement is facilitated by an initial pressure roller which forces the workpiece into the forming mandrel. The mating of the serrations provide the means for holding successive loops of the workpiece, the now developing helical coil, in a fixed relationship as to each other.

Considered in another analogy, the impingement of workpiece upon forming mandrel may be likened to the relationship existing between the internal teeth of a ring gear and the teeth of its complemental spur gear.

The driving helix of the invention is a stationary hollow tube having an outboard or forwardly facing end face machined to define a helix of circular pitch having a width at least equal to the width of the wire or foil workpiece being employed. The helix provides the spacing necessary for the feeding of the incoming workpiece thereinto and facilitates generation of the force necessary for pushing the formed helical coil away from the helix and laterally along the forming mandrel.

The initial pressure roller of the invention is disposed proximate the driving helix and allows a restrictive gap between itself and the forming mandrel so as to force the workpiece being fed therebetween at an oblique angle and into intimate contact with the forming mandrel, in the process generating a sufficiency of radial load so as to develop serrations on the inside surface of the curled workpiece as it is being spirally formed conforming to the serrations on the forming mandrel.

In this way a helical configuration is generated which defines a developing formed mandrel as a supportive base for a tubing now to be constructed with the driving helix serving as a means for progressing the formed mandrel longitudinally of the forming mandrel, and with the interengagement of the mating serrations of the forming and formed mandrels serving to impart a positive rotative force to the developing formed mandrel.

Unreeling means downstream of the initial pressure means now allow the continuous in seriatim spiral feeding of a plurality of ribbons of indefinite length for forming successive contiguous helical convolutions each having a central axis formed at an angle oblique to the longitudinal axis of the winding mandrel in the buildup of a tubing on the forming mandrel. The ribbons may be of tape or fabric.

Supplemental pressure means serve to press the contiguous layers radially inwardly relative to the winding mandrel. They create pinch points under controlled pressure to assist in the wrapping of the successive layers while also forcing the same into a more positive contact with the serrated mandrel.

Heating means is also employed for fusing the enwrapped layers.

Should any external support or compression be necessary during any drying or curing or sintering stage, it is comprehended additionally to simultaneously wrap an exterior layer of a reinforcement material over the built up layers before passage to the heating oven, and then conceivably to remove such reinforcement after the forming process is completed by taking advantage of the rotation of the formed tubing to unwrap the reinforcement therefrom.

Once the tubing is formed, the forming mandrel can be either left in place for removal at a subsequent time, or removed from interiorly of the finally developed fused self-sustaining tubing.

The relationships of the fixed and movable components conceivably can be reversed in application, as for instance, the serrated forming mandrel might be held in fixed position and the driving helix might be the rotated member.

Also conceivably, the formed mandrel may serve as the base for the wrapping or welding thereupon of a metal-formed strip in the fabrication of a metal corrugated tubing.

Figure 9:
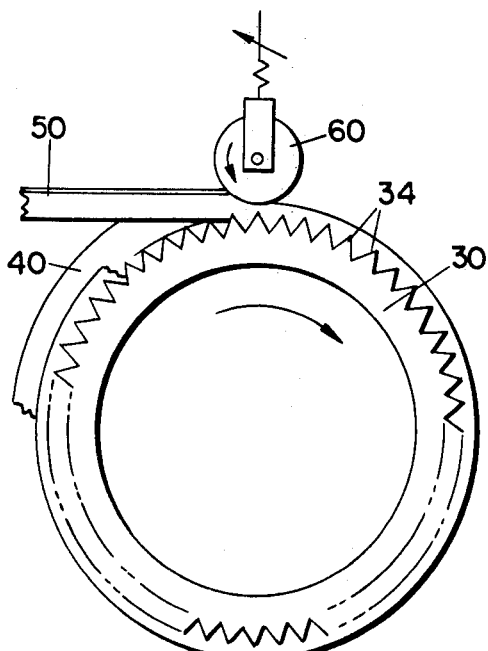
Figure 10:
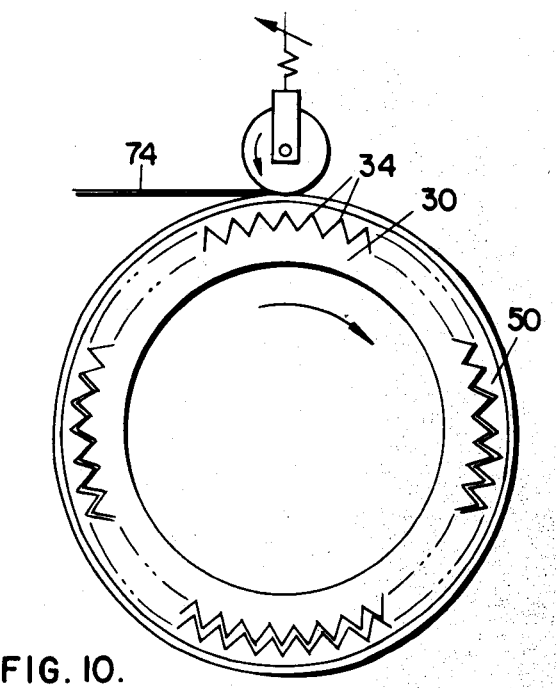

FIG. 9 is a schematic view to dramatize the impingement of the workpiece onto the forming or master mandrel; and FIG. 10 is a schematic view to dramatize the impingement of a wrapping material over the formed mandrel in the buildup of a tubing and the orientation of the formed mandrel as it is brought into positive driving control by means of a pressure roller, and also indicating the necessary clearance for allowing a slippage of the work along the serrated mandrel.

DETAILED DESCRIPTION OF THE INVENTION

Figure 1:
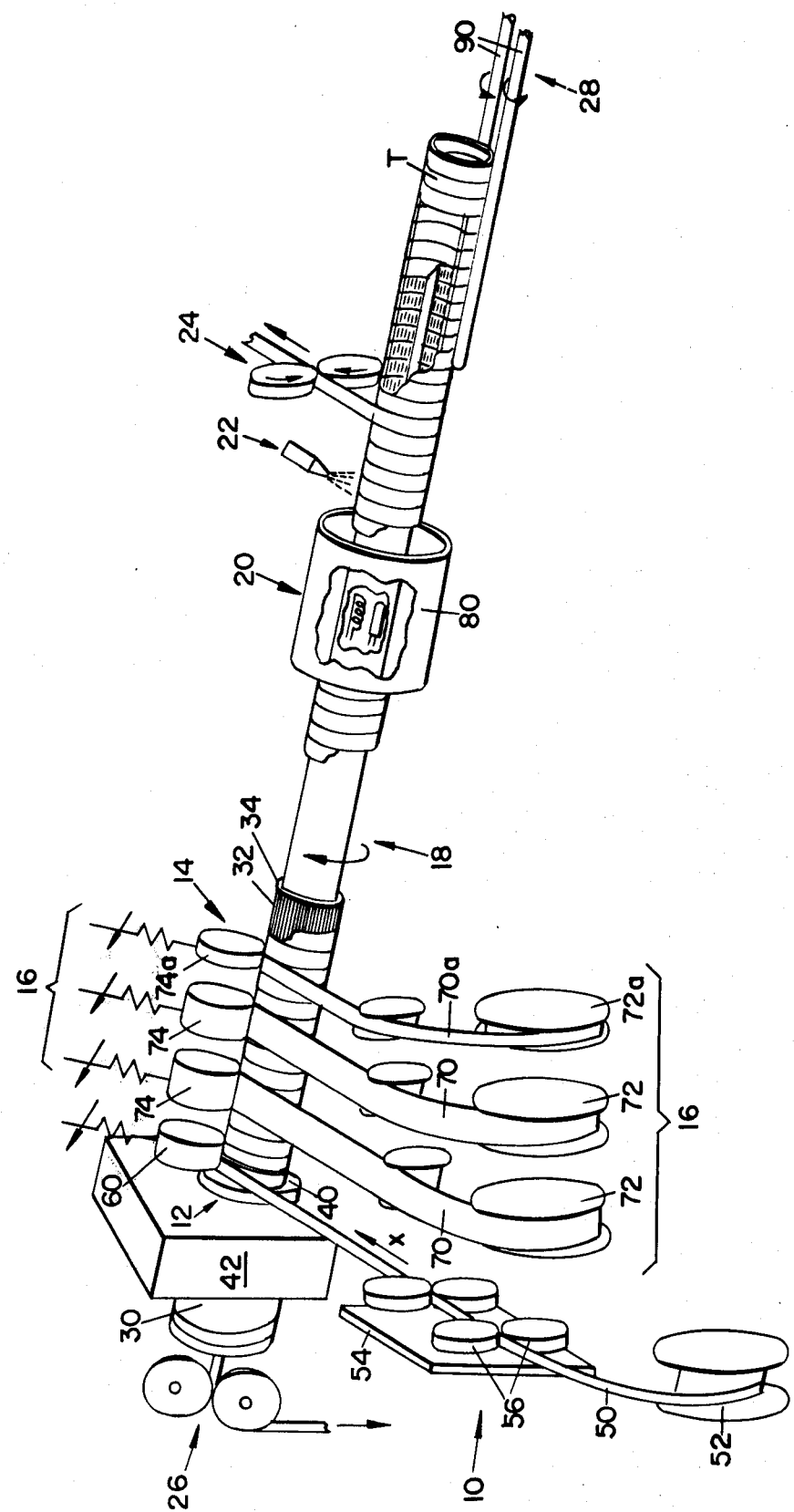
FIG. 1 is a schematic isometric view of exemplary equipment used in practicing the method of the invention.

FIG. 1 illustrates schematically the method of the invention and dramatizes the capability of forming tubing on a continuing basis.

The subassemblies of the machine therein represented are a workpiece (either a wire or a foil) former indicated generally by 10, a stationary driving helix and pressure roller indicated generally by 12, a rotative forming or master mandrel indicated generally by 14, one or more tape or fabric formers and associated pressure rollers indicated generally by 16, an internal supporting means indicated generally by 18, a heating or curing unit indicated generally by 20, a cooling or quenching means indicated by 22, an exterior reinforcement removal means indicated generally by 24, a formed mandrel extractor indicated generally by 26, a tubing takeoff and external tubing support indicated generally by 28, and a self-sustaining completely-formed tubing represented by T.

Figure 2:
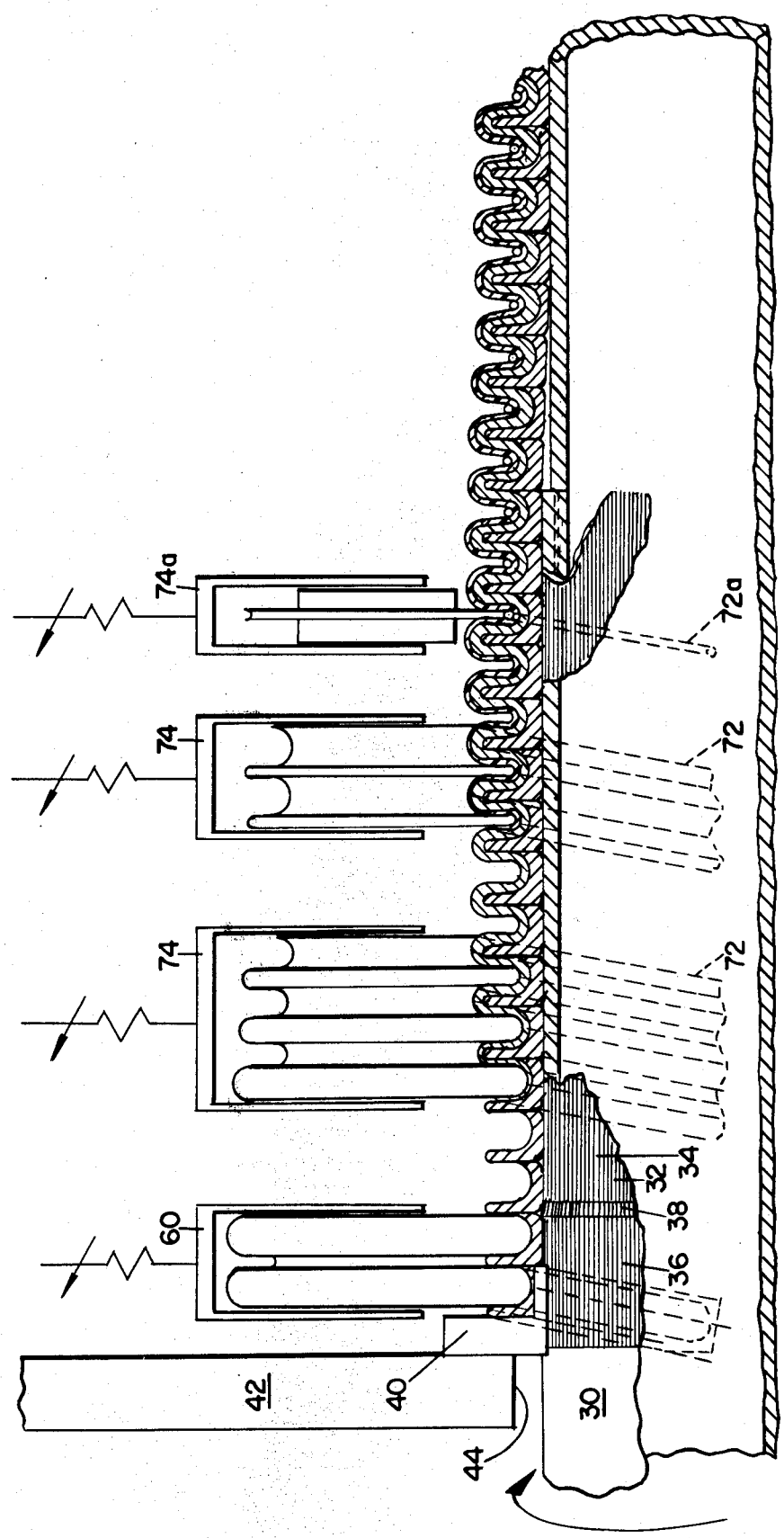
FIG. 2 is an enlarged sectional view with parts broken away showing certain details of the apparatus and method of the invention.
Figure 3:
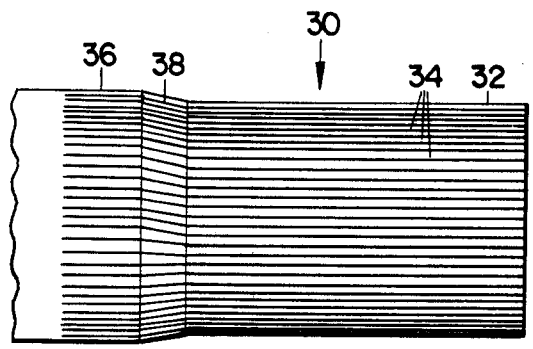
FIG. 3 is an enlarged fragmentary elevational view of the forming end of the forming or master mandrel.
Figure 4:
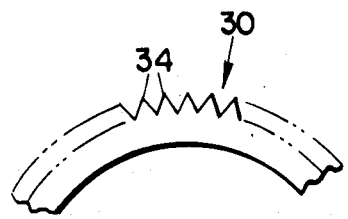
FIG. 4 is an enlarged sectional view of a portion of the FIG. 3 forming mandrel.

A rotatable hollow forming or master mandrel 30 is provided with a first cylindrical surface 32 of a certain diameter which is serrated throughout its length, with the serrations 34 extending longitudinally or lengthwise of the mandrel, leftward as viewed in FIG. 2, toward and to the outboard end thereof, and is also provided with a second cylindrical surface 36 of a diameter slightly greater than the said certain diameter, and likewise serrated, with the two surfaces being separated by an inclined step 38, similarly serrated.

A stationary cylindrical hollow driving helix 40 is sleeved over forming mandrel 30 adjacent the inboard end thereof and is supported by a pillow block 42, through the central opening 44 of which the forming mandrel extends.

Figure 8:
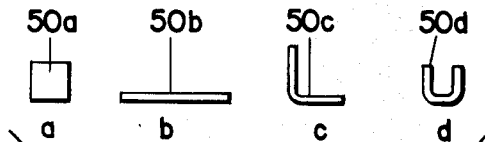
FIG. 8 is a series of sectional views of a workpiece of the invention after profiling and prior to introduction to the helix, FIGS. 8a–8d showing the workpiece profiled in square, flattened, L-shape and U-shaped configurations respectively.

A workpiece 50, to serve as the supportive base, is in the form of a wire or foil or equivalent material, normally sourced from a roll 52. It is uncoiled from the roll in a direction of movement along an X axis as it is consumed by a profiler 54 comprising a plurality of upper and lower rollers 56, through which rollers the wire or foil is passed in order to impart thereto a desired profile which may be square in cross section as shown in FIGS. 8a, flat and bandlike in cross section as shown in FIG. 8b, L-shaped in cross section as shown in FIG. 8c, U-shaped in cross section as shown in FIG. 8d, or otherwise configured to suit a particular purpose in end product.

Annealed aluminum is comprehended as the ideal workpiece material. The layers of covering material could be of plastic, such as polytetrafluoroethylene, or fabric or metal, materials which would be suited for elevated temperatures (in the 700° F. range) requisite for the fusion of the various layers in a heating or curing unit.

Workpiece 50 need not be drawn from an adjacent source roll as shown but obviously could be drawn from other suitable source. Also it need not be profiled at the illustrated profiling station but could be suitably profiled at another situs and brought to the coiling station with the desired configuration already imparted thereto.

If a contoured tubing is desired as the end product, a thin section of foil could be used, conceivably on the order of approximately 0.008–0.015 in thickness. If a smooth bore tubing is desired as the end product, a thin section of wire could be used.

Figure 5:
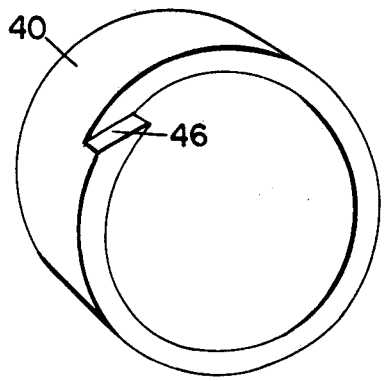
FIG. 5 is an enlarged isometric view of the stationary driving helix.

The so-profiled workpiece is continued in passage from profiler 54 along the X axis through the lead in of driving helix 40 which it engages on its bottom or lower surface while its top or upper surface is confronted by a variable-load initial pressure roller 60 to cause workpiece, either wire or foil, to be deflected and wound around serrated forming mandrel 30 as a generating helical coil in manner such that each successive convolution of the winding is given a deflection so as to cause the coil, now in process of developing as the formed mandrel, to be moved translationally along the Z axis of bend (a line perpendicular to the X axis) by a distance at least equal to the wire or foil diameter or width. That is, the driving helix includes a forwardly-facing end face which is cut with the lead in in the form of a helix of a circular pitch (as shown in FIG. 5) and having a width which is equivalent to at least the diameter or width of the wire or foil of the workpiece so as to provide the requisite space necessary for the accommodation of the incoming run of wire or foil feeding through the helix as well as to allow the generation of a force sufficient to move the workpiece away from the helix and laterally along the forming mandrel in the process of developing the formed mandrel as the supporting base upon which the tubing is to be built.

Figure 6:
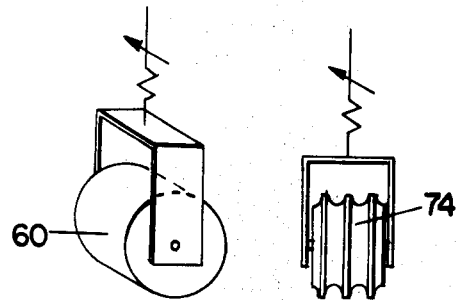
FIG. 6 is an isometric view of the variable force initial pressure roller.
Figure 7:
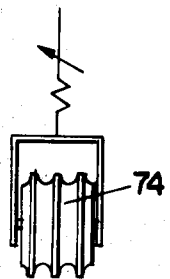
FIG. 7 is a front elevational view of one form of a variable force supplemental pressure roller used in pressuring additional or built-up layers of tape or fabric upon the formed mandrel.

Initial pressure roller 60 is located proximate the driving helix 40 through which the wire or foil passes before it comes into contact with the master mandrel. Roller 60 will be loaded as by a regulated spring and may be flat, as shown in FIG. 6 or contoured, as shown in FIG. 2, depending upon the geometry of the wire or foil being used, and will serve to create a restrictive gap, thus forcing the wire or foil into direct and intimate contact with the forming mandrel, it generating a sufficient radial load to force the workpiece onto and into the serrated forming mandrel, thus forming the mating serrations on the inside surface of the formed mandrel being produced and allowing the forming and formed mandrels to be unisonly rotated. The mating serrations act positively to drive the formed mandrel rotationally and also to hold the successive loops of the wire or foil relative to each other.

Forward progress of the formed mandrel along the forming mandrel is facilitated by the change in diameter of the forming mandrel. The tendency to develop a resistance to the forward progress of the formed mandrel along and relative to the circumscribed forming mandrel is offset by the difference in diameters of the forming mandrel. The generated convolution of the workpiece is given a first certain diameter (a larger diameter) near the arch of the helix. Then, when the formation is passed forwardly or laterally along to that portion of the forming mandrel having the lesser diameter, the formed mandrel is relieved of binding thereon.

The developing formed mandrel serves as the supportive base structure upon which one or more enwrapments of ribbons of a plastic or fabric or metal or similar tape material may be successively formed therearound.

In the exemplification, three such plastic or fabric or metal ribbons of indefinite length 70, 70, 70a are shown as being unwound from respective source rolls 72, 72,

72a, the rolls being disposed in laterally spaced relationship with respect to the forming mandrel so that the ribbons may be fed to the developing formed mandrel at oblique angles to its direction of progress and may be applied in seriatim upon the formed mandrel in the development of the built up tubing.

The rotative and transverse movement of the formed mandrel allows the simultaneous enwrapment thereupon of the ribbons, either in a side-by-side or an overlapping disposition.

As many tapes may be employed as may be desired to achieve the requisite thickness in the defining of a tubing, which tubing may be either rigid or flexible in its structure.

Pressure rollers 74, 74, 74a, called tape/fabric/metal rollers are positioned along a common axis generally located at the apex of the rotating forming mandrel. These rollers are either flat or contoured, again depending upon the geometry of the wire or foil being used, and serve to create pinch points under regulated pressure, so that the interface of the tape being wrapped under tension will be more intimate with the previously wrapped convolution.

The quality of adherance or bond is directly related to the interface between the successive wraps of tape or fabric. Additionally, the rollers serve to apply such pressure through the material being wrapped that the serrations on the inside of the formed mandrel are brought into an even more intimate contact with the serrations on the rotating master mandrel which now acts as a spur gear.

By forcing contact at one point on a circumference, the remaining circular arc of wire form is free to move laterally along the serrated master mandrel. See FIG. 10. This pressure also locks successive loops of the formed mandrel to each other at a time when additional tape or fabric is being applied as well as to impart a positive rotational drive to the forming mandrel.

While the master or forming mandrel 30 has been described as a hollow tube with an outer peripheral surface that is finely serrated longitudinally thereof, it may be described as being provided with teeth as might be formed were a gear cutter employed with the mandrel in such case being described as functioning as a spur gear impinging its teeth into the underside of the wire or foil of the workpiece, described as a mating ring gear with internal teeth.

This impingement acts not only to power the workpiece about the mandrel but also to hold successive loops of the workpiece relative to each other as they are promoted longitudinally along the master mandrel surface.

Should any external support or compression be necessary, prior to or following sintering or during the drying or curing stage, it is possible to simultaneously wrap an exterior layer of a reinforcement material 70a such as a wire from a last roll 72a, and then to remove such reinforcement wire after the forming process is completed by taking advantage of the rotation of the formed tubing to unwrap the reinforcement therefrom.

Downstream of the ribbon winding operations, the formed mandrel with its buildup of tapes may be passed through the tunnel of a heating element 80 for the purpose of heating the developing structure and fusing the enwrapped layers.

Following passage through the heating means, the developed tubing may be exposed to a cooling or quenching treatment from a source 22, and therefollowing, means 24 may be provided for the removal of the exterior reinforcement material 70a such as wire, the means taking advantage of the rotation of the formed tubing to unwrap the reinforcement therefrom.

During the forward progress of the formed mandrel, the developing structure can be supported externally as by a pair of rotating support rods 90 disposed below the tubing or can be supported internally by a rotating support tube 18.

Means are provided for removing the formed mandrel from interiorly of the constructed tubing. To remove the forming mandrel as in a continuous process, the leading end of the base form is pulled back in the reverse direction of propagation through the center of the forming mandrel. As this is done, the material folds back on itself and twists out of its supportive position. The removed material may now be considered as waste or may be reclaimed and returned to be used again.

The above recited relationships of the fixed and movable components conceivably can be reversed in application. For example, the forming mandrel could be held fixed and the driving helix could be the rotatable element.

The formed or slave mandrel might also serve as the base for the wrapping and folding or welding of a metal-formed strip in the fabrication of a metal corrugated tubing.

Primary interest is directed to wrapping a tubing of PTFE. However, any material can be wrapped upon the typical forming mandrel thereof, it being realistic even to form a metal tubing where the rollers would be used to fold the tubing to form the necessary interlocks between the successive coils.

I claim:

1. A method for generating a continuously-formed mandrel as a supportive base in the building of a tubing therearound comprising the steps of:

feeding a profiled workpiece in ribbon form to and through a stationary force generating helix, deflecting the workpiece passed from the helix by an initial pressure means into a spiralled configuration around a rotative serrated forming mandrel, impinging the workpiece into the serrations of the forming mandrel for the formation of teeth in the workpiece as the workpiece develops as a formed mandrel, maintaining intimate mating contact between the teeth of the workpiece and the serrations of the forming mandrel only at the point of pressure of the initial pressure means, progressing the formed mandrel longitudinally of the forming mandrel under the force generated by the helix in the exploitation of the clearance between formed mandrel and forming mandrel for facilitating the longitudinal translation, enwrapping a tape in a layer configuration exteriorly of and around the formed mandrel in the buildup of a tubing, and removing the formed mandrel from interiorly of a finally self-sustaining tubing.

2. In the method of claim 1, the utilization of an additional pressure means for the development of a more intimate contact between the tape layer and formed mandrel.

3. In the method of claim 1, the utilization of additional pressure means for development of an increased positive driving relationship between the forming mandrel and the formed mandrel during the tubing-building process.

4. In the method of claim 1, the utilization of additional pressure means for the development of point contact circumferentially of a formed loop of the formed mandrel and the allowance of the forward translation of the remainder of the formed loop.

5. In the method of claim 1, the utilization of additional pressure means for the holding of successive loops of the toothed workpiece relative to the toothed forming mandrel.

6. In the method of claim 1, the additional step of profiling the ribbon workpiece preliminary to introduction to the helix.

7. In the method of claim 1, the workpiece being in the form of a wire.

8. In the method of claim 1, the workpiece being in the form of a foil.

9. In the method of claim 1, the enwrapping tape being in the form of a plastic.

10. In the method of claim 1, the enwrapping tape being in the form of a fabric.

11. In the method of claim 1, the additional step of heating the developing tubing for the hardening of the enwrapping tape.

12. In the method of claim 1, the additional step of winding a reinforcing material exteriorly of the outer surface of the developing tubing.

13. In the method of claim 12, the additional step of removing the reinforcing material from the outer surface of the tubing.

14. In the method of claim 1, the additional step of exteriorly supporting the developing tubing.

15. In the method of claim 1, the additional step of interiorly supporting the developing tubing.

16. In the method of claim 1, with the helix constituting the rotative member and the forming mandrel constituting the stationary member.

17. In apparatus for continuously-developing multilayer tubing from plural ribbons of wrapping material of indefinite length layered in seriatim upon a continuously-formed mandrel serving as a temporary supportive base for the tubing, the combination of:

a driven cylindrical forming mandrel rotatable about its longitudinal axis and having a plurality of longitudinally-extending serrations on its periphery, a stationary driving helix concentrically associated with the forming mandrel for feeding a ribboned workpiece introduced thereto to the forming mandrel, initial pressure means for continuously winding the workpiece received from the driving helix radially inwardly into adjacent helical convolutions circumscribing the forming mandrel with a central axis formed at an oblique angle to the longitudinal axis of the forming mandrel, impressing the serrations of the forming mandrel on the under side of the convolutions of the formed mandrel in the generation of the helical configuration of a developing formed mandrel as a supportive base, the driving helix serving as a means for progressing the formed mandrel longitudinally of the forming mandrel, the interengagement of the mating serrations of the forming and formed mandrels imparting a positive rotative force to the formed mandrel while holding the successive formed loops relative to each other as they are promoted longitudinally along the mandrel surface, means downstream of the initial pressure means for the in seriatim feeding of a plurality of ribbons for forming successive contiguous helical convolutions in the buildup of a tubing on the formed mandrel, supplemental pressure means for pressing the contiguous layers radially inwardly relative to the forming mandrel, heating means for fusing the enwrapped layers, and means for removing the formed mandrel from interiorly of the finally-developed fused self-sustaining tubing.

18. In the apparatus of claim 17, including means in advance of the driving helix for continuously forming a profiled configuration in the workpiece preliminary to being fed to the driving helix for determining the spacing of the adjacent turns in the eventual helical coil and providing a helically-arranged corrugation on the interior wall of the eventual tubing.

19. For continuously joining together a succession of layers of components in convoluted form by fusion between the contiguous layers in the buildup of a self-sustaining tubing, the method which includes the steps of:

(a) deflecting a workpiece emanating from a driving helix past a cooperant initial pressure means and around a rotative serrated forming mandrel as a helical coil in the definition of a developing formed mandrel, (b) pressing the convolutions of the developing formed mandrel radially inwardly against the serrations of the forming mandrel in the generation of mating serrations on the inside wall of the formed mandrel forming teeth in the formed mandrel, (c) maintaining a pressure between formed mandrel and forming mandrel only at the point of pressure, (d) progressing the formed mandrel by the force of the driving helix longitudinally of the forming mandrel, (e) enwrapping a series of ribbons of tapes in successive helical convolutions exteriorly of and around the formed mandrel in the buildup of a tubing, (f) passing the tubing through a heating means for effecting a fusion of the tape layers, and (g) removing the formed mandrel from interiorly of the now self-sustaining tubing.

20. In the method of claim 19, the step of profiling the workpiece in advance of its deflection into a helical coil for determining the configuration of the interior wall of the tubing.

21. In the method of claim 19, the longitudinal translation of the formed mandrel along the forming mandrel being resultant from the forces generated by the helix.

22. In the method of claim 19, the initial pressure means urging the workpiece against the serrations of the forming mandrel for the development of mating serrations on the workpiece.

23. In the method of claim 19, the mating serrations on the workpiece and forming mandrel ensuring a rotational motion of the workpiece and fixed relative positions between the successive loops thereof.

24. In the method of claim 19, the interengagement between the helical coil of the workpiece and the forming mandrel ensuring a rotational motion of the workpiece and fixed relative positions between the successive loops of the coil.

25. In the method of claim 19, the utilization of an additional pressure means for the development of more intimate contact between the tape layer and the formed mandrel.

26. In the method of claim 19, the utilization of additional pressure means for development of an increased positive driving relationship between forming mandrel and the tubing in process of building.

27. In the method of claim 19, the utilization of additional pressure means for the development of point contact circumferentially of a formed loop of the formed mandrel and the allowance of the forward translation of the remainder of the formed loop.

28. In the method of claim 19, the utilization of additional pressure means for the holding of successive loops of the workpiece in situ relative to the forming mandrel during the period of tape application.

29. In the method of claim 19, the additional step of profiling the ribbon workpiece preliminary to introduction to the helix.

30. In the method of claim 19, the workpiece being in the form of a wire.

31. In the method of claim 19, the enwrapping tape being in the form of a metal.

32. Mechanism for the control of the transmission of the energy from a prime mover as a load or driven member is driven comprising in combination:
a rotatable tubular transmitting line longitudinally serrated around its outer periphery defining analagously the toothed gearing of a spur gear;
a stationary helix concentrically arranged relative to the transmitting line and to and about which the load is fed;
a pressure means for deflecting the load delivered from the helix into an initial arc in impinging relationship with the teeth of the spur gear of the transmitting line for forming mating teeth on the load defining analagously an internal ring gear constituted by the load circumscribing the transmitting line in the form of a developing continuously-formed, helically-wound driven member;
with the driven member being simultaneously lateral progressed and rotated along and about the transmitting line;
the prime mover comprising the conjointly-functioning transmitting line and helix and pressure means.

33. In a method of controlling the output of power delivery to a workpiece generating from a continuous band in uncoiled condition into a spirally-wound tubing along a transmitting line with a prime mover being disposed at one end of, and with a load emanating from the other end of, the transmitting line, the steps of:
feeding a workpiece in ribbon form to and about a stationary helix of the prime mover circumscribed around a rotatable tubular peripherally serrated transmitting line of the prime mover;
deflecting by way of a pressure means of the prime mover the workpiece delivered from the helix into an initial arc in impinging relationship with the serrations of the transmitting line for forming mating teeth on the developing helically-wound workpiece circumscribing the transmitting line in its generation into the tubing as it is simultaneously laterally progressed and rotated along and about the transmitting line.

34. In mechanism for the output control of power delivery to a workpiece generating from a continuous ribbon into a spirally-wound tubing through a transmitting line with a prime mover being disposed at one end of, and with the formed tubing emanating from the other end of, the transmitting line, the combination of:
a rotatable tubular transmitting line longitudinally serrated around its outer periphery for serving as the toothed gearing of a spur gear;
a stationary helix concentrically arranged relative to the transmitting line and to and about which the workpiece is fed;
a pressure means for deflecting the workpiece delivered from the helix into an initial arc in impinging relationship with the teeth of the spur gear of the transmitting line and forming mating teeth on the workpiece serving as the internal ring gear constituted by the developing helically-wound workpiece circumscribing the transmitting line;
with the remaining circular arc of the developing workpiece being in relatively loose inter-relationship for the simultaneous lateral progression and rotation of the workpiece along and about the transmitting line;
the prime mover comprising the conjointly-functioning transmitting line and helix and pressure means.

* * * * *